(12) United States Patent
Guo

(10) Patent No.: US 9,146,922 B2
(45) Date of Patent: Sep. 29, 2015

(54) MOBILE MULTIMEDIA PROXY DATABASE

(75) Inventor: Dongbai Guo, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1515 days.

(21) Appl. No.: 11/881,341

(22) Filed: Jul. 26, 2007

(65) Prior Publication Data
US 2009/0030911 A1    Jan. 29, 2009

(51) Int. Cl.
*G06F 7/00*      (2006.01)
*G06F 17/30*    (2006.01)

(52) U.S. Cl.
CPC .................... *G06F 17/30017* (2013.01)

(58) Field of Classification Search
USPC .............. 707/104.1, 613, 614, 617, 621, 622, 707/636, 655, 764, 809
See application file for complete search history.

(56) References Cited

U.S. PATENT DOCUMENTS

| | | | |
|---|---|---|---|
| 2003/0061106 A1* | 3/2003 | Orhomuru | 705/26 |
| 2003/0100308 A1 | 5/2003 | Rusch | |
| 2005/0050142 A1* | 3/2005 | Capone et al. | 709/204 |
| 2005/0207644 A1* | 9/2005 | Kitagawara et al. | 382/167 |
| 2006/0129631 A1 | 6/2006 | Na et al. | |
| 2006/0271688 A1* | 11/2006 | Viger et al. | 709/227 |
| 2007/0002366 A1 | 1/2007 | Wang | |
| 2007/0008321 A1* | 1/2007 | Gallagher et al. | 345/473 |
| 2007/0111748 A1* | 5/2007 | Risbood | 455/550.1 |
| 2007/0250232 A1* | 10/2007 | Dourney et al. | 701/35 |
| 2008/0192129 A1* | 8/2008 | Walker et al. | 348/231.2 |
| 2009/0002192 A1* | 1/2009 | Whiteman | 340/850 |

FOREIGN PATENT DOCUMENTS

WO    2005/116868 A1    12/2005

OTHER PUBLICATIONS

PCT International Search Report and Written Opinion of the International Searching Authority having a date of mailing of Aug. 20, 2008, in co-pending PCT International Patent Application No. PCT/US2008/005895, having an International Filing Date of May 8, 2008, with the applicant of Oracale International Corporation and entitled: Mobile Multimedia Proxy Database.
Basagoiti, P., et al.: "INTFO: Corporation Integrated Multimedia Intelligent Assistant for Field Operators, an Overview", by Electricity Distribution Part 1: Contributions Cired. 14th International Conference and Exhibition on (IEE Conf. Publ. No. 438), London, UK, IEE, UK vol. 6, Jun. 2-5, 1997, pp. 11.1-11.5.

* cited by examiner

*Primary Examiner* — Mark E Hershley
(74) *Attorney, Agent, or Firm* — Kraguljac Law Group, LLC

(57) ABSTRACT

Systems, methodologies, media, and other embodiments associated with a mobile multimedia database are described. One exemplary system embodiment includes a mobile database and logic for communicating media data from the mobile database to an enterprise database. The exemplary system may also include logic for creating a media service request and for communicating the media service request from the system to the enterprise database. A media service request may describe an action on a piece of media data. The exemplary system may also include logic for receiving a media service reply from the enterprise database. A media service reply may describe an action performed by the enterprise database in response to the media service request.

30 Claims, 12 Drawing Sheets

MOBILE MULTIMEDIA PROXY DATABASE

BACKGROUND

Mobile data capture devices (MDCD) are used to capture data. Mobile data capture devices may include, for example, cellular telephones, personal digital assistants (PDAs), digital cameras, digital video recorders, and so on. MDCDs are used in different environments and in different industries to capture, store, and even process different types of data. Users may desire to take actions including querying, managing, and protecting the data captured on the MDCD. However, MDCDs have typically been limited in the actions that they can perform. Typically, many actions related to processing captured data have only been available at a "back-end" processor having more extensive capabilities than the "front-end" MDCD.

Some MDCDs have even included a local database component. Once again this component has typically been limited and thus many database related actions have only been available at a back-end database. Traditionally, these "front-end" mobile databases (MDBs) have synchronized with a back-end enterprise database (EDB) to keep both systems up to date.

Consider figure one. An MDB 110 may communicate with an EDB 120. While a single MDB 110 is illustrated, it is to be appreciated that in some case multiple MDBs could be connected to the same EDB 120. The communication may be, for example, a data synchronization illustrated as flow 130. The MDB 110 may be a light-weight embeddable database that provides only limited multimedia storage ability. MDB 110 may run on a simple MDCD. The data synchronization may be a one-way and/or two-way data synchronization between the MDB 110 and the EDB 120. Data (e.g., text, media) can be captured by the MDCD on which the MDB 110 runs and then uploaded to the EDB 120. Similarly, data may be downloaded from the EDB 120 to the MDB 110. The EDB 120 may be a back-end database with more extensive storage and processing capabilities than the MDB 110. In one example, the MDB 110 may have limited media (e.g., digital image, voice, video, MP3) storage and/or processing capability while the EDB 120 may have more extensive media storage and/or processing capability.

In some cases, MDB 110 may not recognize multimedia data and thus MDB 110 can not possibly provide functions including searching, indexing, querying, and so on, of multimedia data. In some examples, media and/or multimedia data may simply have been treated by an MDCD and its MDB 110 as a related collection of an unknown stream of bytes. Thus, this data may have been stored as a binary large object (BLOB) upon which no operations could be performed by the MDB 110 other than transferring the BLOB to the EDB 120.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
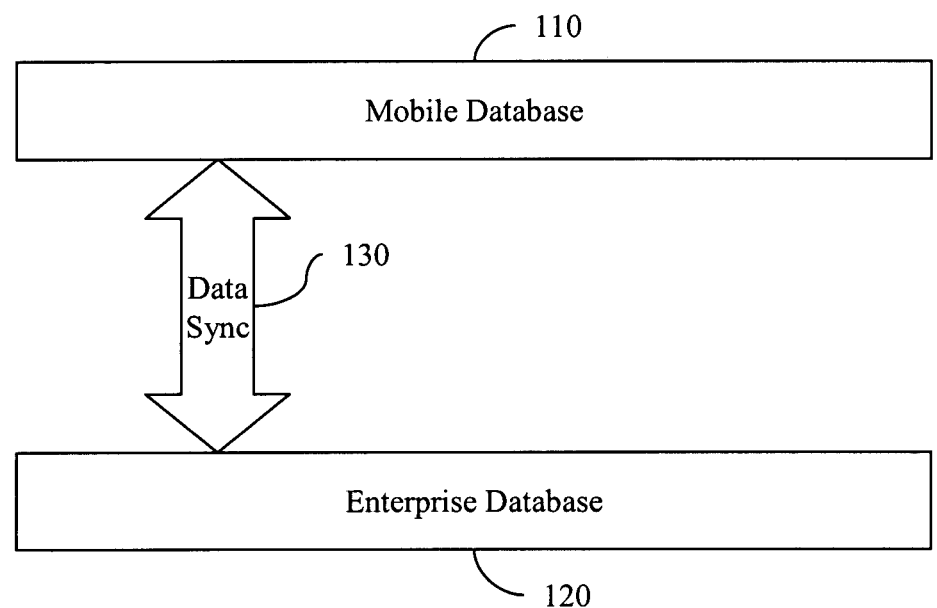
FIG. 1 illustrates a conventional data synchronization data flow between a conventional mobile database and a conventional enterprise database.

Example systems and methods concern a mobile database. The mobile database may store, for example, media and/or multimedia data. The mobile database may include additional logics (e.g., proxy objects) that may make the mobile database appear to provide additional functionality typically associated with a more powerful back-end database. The additional logic may facilitate, for example, recognizing multimedia data, creating service requests, communicating multimedia data to an enterprise database, communicating service requests to an enterprise database, receiving service replies from an enterprise database, processing service replies received from an enterprise database, and so on. In one example, the additional logics (e.g., proxy objects) may import semantics from the enterprise database to the mobile database.

In one example, the additional logics associated with the mobile database may invoke multimedia services on a complete multimedia object stored in an enterprise database. Since a mobile database may not be continuously connected (e.g., logically, physically) to an enterprise database, the additional logics may queue service requests for later transmission to an enterprise database. In one example, these service requests may be transaction protected. Thus, logics (e.g., objects) at the enterprise database may facilitate storing an entire multimedia object, performing actions in response to service requests received from a mobile database, and providing responses describing the performed service requests. In one example MDB, a transaction may be securely backed-up on a securable removable storage (e.g., fire-proof storage box) to facilitate restoring or recovering.

While a mobile database and an enterprise database may not be continuously connected, either logically and/or physically, they may be connected at times. When connected (e.g., docked, in data communication), service requests queued on the mobile database may be provided to the enterprise database and performed. A service response may selectively be provided back to the mobile database by the enterprise database. Which actions are performed in which database may be a dynamic thing. For example, at a first time, a first action may be performed in an enterprise database. However, at a second time, logic for performing that first action may migrate to the mobile database. Thus, at the second time, the first action may be performed in the mobile database. Similarly, some functionality may migrate from the mobile database to the enterprise database.

Which functionality migrates, and whether functionality migrates, may depend on factors including, but not limited to, relative loads on devices on which the databases are running, connectivity between the databases, relative computing power on devices on which the databases are running, security, and so on. By way of illustration, a first mobile device on which a first mobile database is running may have a first amount of computing power. This first mobile device may interact with an enterprise database supported by a computing system. The computing system may have an overwhelming ratio of computing power compared to the mobile device and thus much functionality may reside in the enterprise database. However, a second mobile device on which a second mobile database is running may have a second, much greater amount of computing power than the first mobile device. This second device may also interact with the enterprise database supported by the computing system. The ratio of computing power between the two devices may be nearly equivalent. In this second case, some functionality may migrate from the enterprise database to the mobile database. Migration may depend on a mobile database and an enterprise database sharing a common interface (e.g., JAVA interface). In one example, so long as the mobile database and the enterprise database agree on the interface, functionality may migrate at runtime between the mobile database and the enterprise database.

Consider an enterprise database having XML (extensible markup language) capability. Consider its interactions with a mobile database having some XML capability but not all the XML capability of the enterprise database with which it may communicate. Example systems may provide the mobile database with a proxy object configured to queue up service requests for XML processing on the enterprise database.

A mobile database configured with example logics (e.g., proxy objects) may behave as though it can natively search, index, and process media content. Some of these functions may actually be performed on the device on which the mobile database is running. However, some of the functions may be performed on the device on which a related enterprise database is running. Implementing a service request queue on the mobile database and making it persistent facilitates logically migrating services from an enterprise database to a mobile database while still having the physical work performed on the enterprise database.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software in execution, and/or combinations of each to perform a function(s) or an action(s), and/or to cause a function or action from another logic, method, and/or system. Logic may include a software controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions in execution that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

Figure 2:
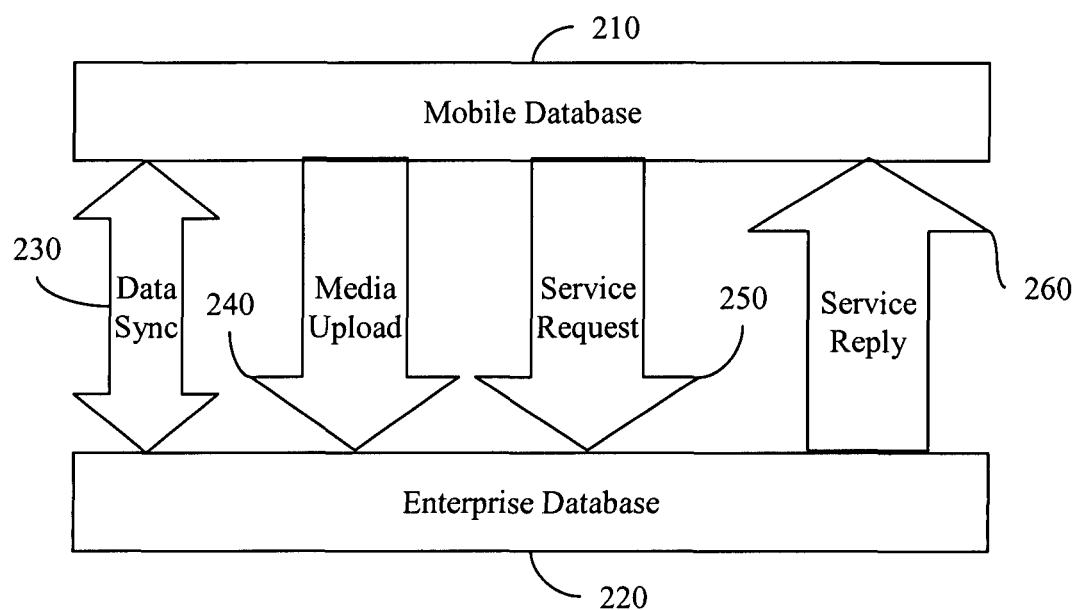
FIG. 2 illustrates example data flows between an example mobile database and an example enterprise database.

FIG. 2 illustrates example data flows between an example mobile database 210 and an example enterprise database 220. Rather than simply providing a repository for a data capture device, MDB 210 may be a light-weight front-end embeddable database that acts as a proxy to the EDB 220. Thus, MDB 210 may offer media and/or multimedia storage and management capability provided by EDB 220. EDB 220 may be a back-end database having more extensive storage and media and/or multimedia support than MDB 210. EDB 220 may therefore act as a multimedia service provider for front-end MDB 210. While EDB 220 is illustrated as a single entity, it is to be appreciated that EDB 220 may be implemented in a tiered fashion (e.g., mid-tier, database-tier) and/or in a distributed fashion.

FIG. 2 illustrates four separate data flows between MDB 210 and EDB 220. In addition to the traditional data synchronization flow 230 between the MDB 210 and the EDB 220, media data can be uploaded to the EDB 220 via a media upload flow 240. In one example, a media upload may be logically associated with an accompanying service request. The service request may traverse service request flow 250. While an "accompanying" request is described, it is to be appreciated that media uploads and service requests may be independent of each other. The EDB 220 can process service requests and provide service responses that may traverse service reply flow 260. The service response can enhance the media management capability of the MDB 210. The MDB 210 may further interpret the service response to provide even more capabilities. The data flows illustrated in FIG. 2 facilitate the MDB 210 providing media services that are implemented at the EDB 220 side.

Mobile database 210 may include an intelligent application that can determine which service requests to handle locally and which, if any, to send to an enterprise database. The determination may be based, for example, on a hardware configuration, a software configuration, a ratio of computing power, a load ratio, a communication bandwidth, a security measure, and so on. In one example, the determination may be based on dynamic factors and thus may be made on an ad hoc basis. In another example, the determination may be made on an enterprise or institutional basis and thus may be made once and honored by communicating databases.

In one example, data traversing media upload flow 240 may not be transaction protected. In another example, service requests and service responses traversing flows 250 and 260 may be transaction protected.

While a single instance of each type of flow is illustrated in FIG. 2, it is to be appreciated that more than one flow may be implemented on a single physical channel and a single flow may be implemented on multiple channels. In one example, a mobile database may select a channel(s) for a flow based on factors including, but not limited to, bandwidth, security, signal to noise ratio, cost, and so on. Similarly, while a single MDB 210 is illustrated, it is to be appreciated that in some case multiple MDBs could be connected to the same EDB 220.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, or so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. Flow diagrams illustrate functional information one skilled in the art could use to design/fabricate circuits, generate software, or use a combination of hardware and software to perform the illustrated processing.

Figure 3:
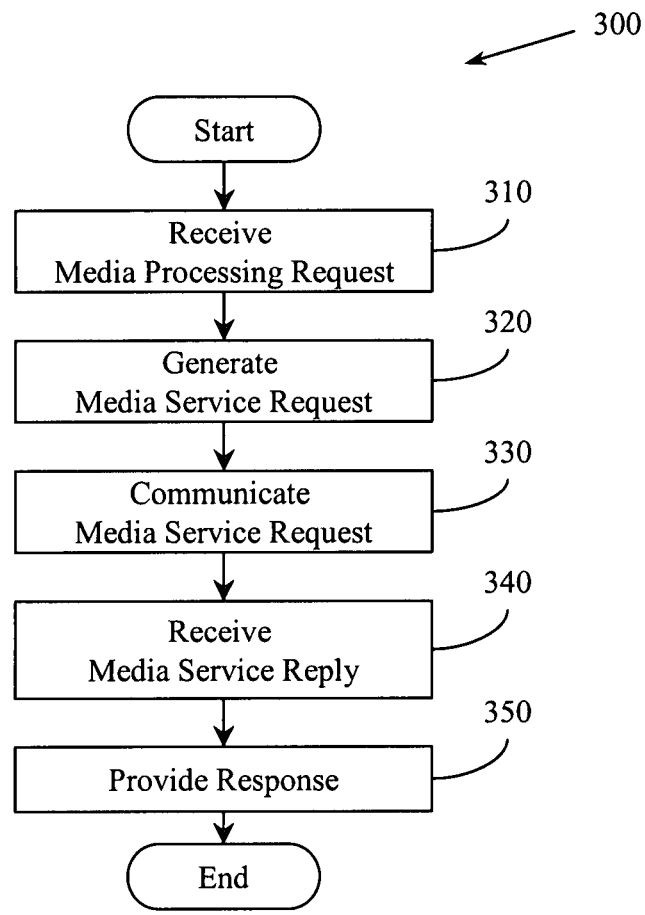
FIG. 3 illustrates an example method associated with a mobile database.

FIG. 3 illustrates a method 300 that may be performed on a device supporting a mobile database. Method 300 may include, at 310, receiving a media processing request at a mobile database. This request may be received, for example, from a user of a mobile device on which the mobile database is located. The request may be, for example, to change a patient name associated with a medical image, to edit the medical image, to retrieve a medical image, and so on. The mobile database may be configured with proxy entities (e.g., proxy objects) related to an enterprise database that is configured to function as a media server for the mobile database. These proxy entities may make services available to the mobile device that would otherwise not be available. Therefore, method 300 may include preparing requests to send to an enterprise database and receiving information back from the enterprise database. Preparing the request may include generating the request and queuing the request for later delivery.

Method 300 may include, at 320, generating a media service request associated with the media processing request. This media service request may seek to have an action performed on media data stored at the enterprise database. The action may include, for example, reporting on metadata associated with the media data, changing metadata associated with the media data, retrieving media data, editing media data, and so on. Generating the media service request may include, for example, creating and formatting a message, creating and formatting a packet, and so on. Generating the media service request may also include queuing the request for later delivery to an enterprise database.

Method 300 may also include, at 330, communicating the media service request from the mobile database to the enterprise database. Communicating the media service request may include selecting a communication procedure, establishing communications using that procedure, and actually transferring the media service request. Having sent the request, method 300 may then wait for a reply. The waiting may be, for example, synchronous or asynchronous. Method 300 may proceed, at 340, with receiving a media service reply from the enterprise database. This media service reply may be related to the media service request. Recall that method 300 began with receiving a media processing request. Thus, method 300 may conclude, at 350, by providing a response to the media processing request. The response may be based, at least in part, on the media service reply.

Figure 4:
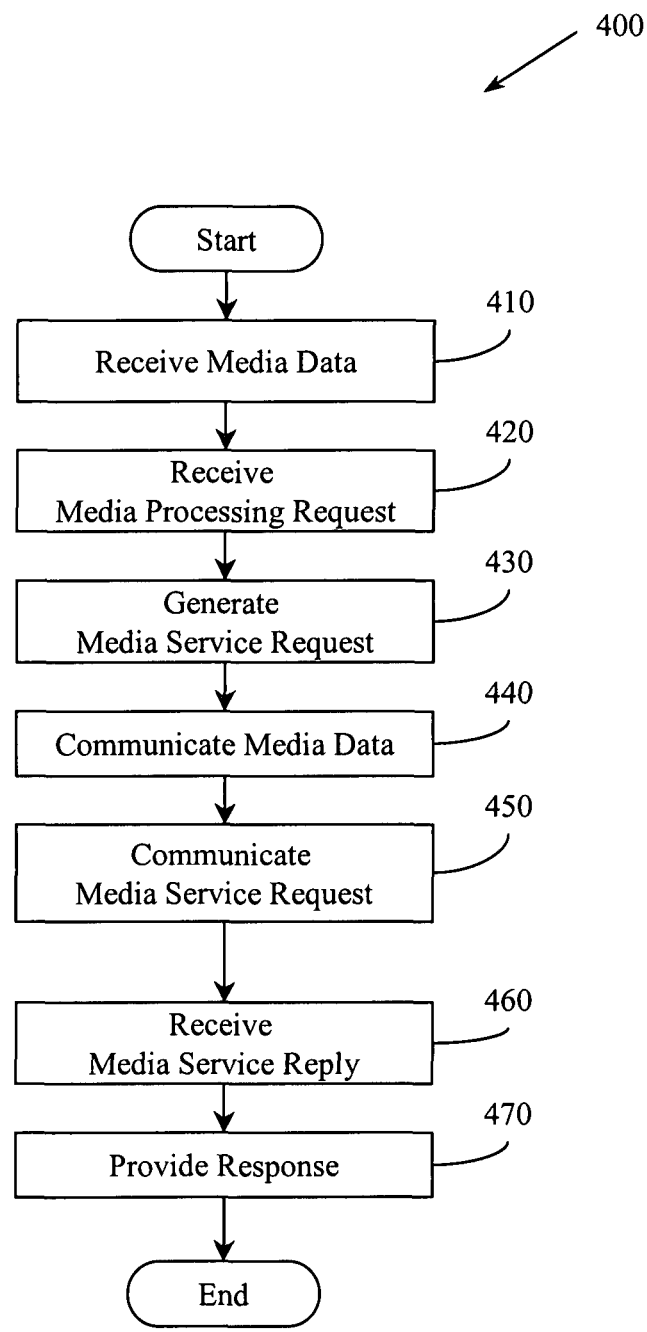
FIG. 4 illustrates an example method associated with a mobile database.

FIG. 4 illustrates a method 400 that has some actions similar to those described in method 300 (FIG. 3). For example, method 400 includes receiving a media processing request at 420, generating a media service request at 430, communicating the media service request at 450, receiving a media service reply at 460, and providing a response at 470. However, method 400 includes other actions associated with receiving and communicating media data.

For example, method 400 includes, at 410, receiving media data. This data (e.g., picture, movie, voice) may be data captured by a mobile data capture device on which the mobile database resides. This data may also be, for example, data received by the mobile device upon which the mobile database resides. The data may be received from other mobile devices, from an enterprise database, and so on.

Having received the data at 410, method 400 may include, at 440, communicating the media data to an enterprise database. The media data may then be processed according to the media service request communicated at 450.

Figure 5:
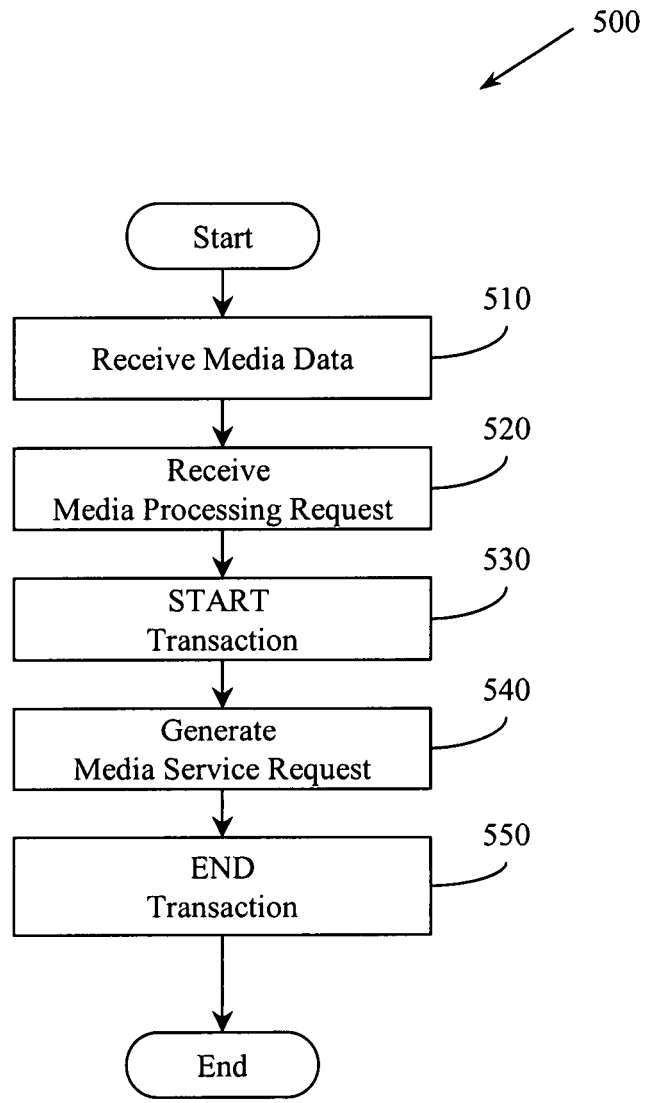
FIG. 5 illustrates an example method associated with a mobile database.

FIG. 5 illustrates a method 500 that includes some actions similar to those associated with method 400 (FIG. 4). For example, method 500 includes receiving media data at 510, receiving a media processing request at 520, and generating a media service request at 540. However, method 500 includes additional actions.

For example, method 500 includes, at 530, starting a first transaction before generating the media service request at 540. This facilitates transaction protecting a media service request. Method 500 may also include, at 550, ending the first transaction after generating the media service request at 540. "Transaction" is used herein in its database form. Thus a transaction may be considered to be a unit of interaction with a DBMS (database management system). The transaction is to be treated in a coherent, reliable manner. The transaction is to be handled independent of other transactions. A transaction is to be completed entirely or aborted entirely. In some examples, a DBMS will guarantee that a transaction is handled atomically, consistently, and durably.

Figure 6:
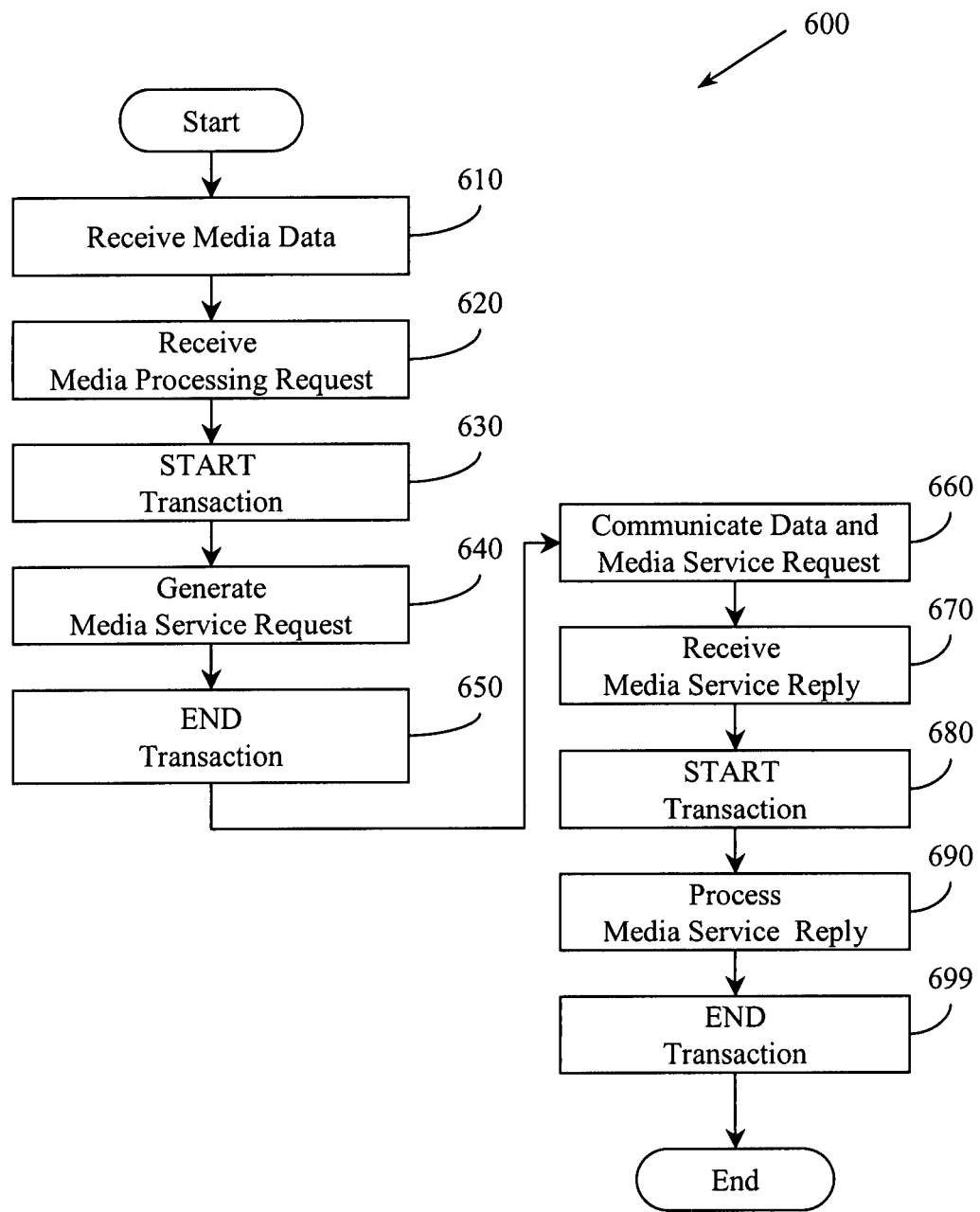
FIG. 6 illustrates an example method associated with a mobile database.

FIG. 6 illustrates a method 600 that includes actions similar to those associated with methods 300 (FIG. 3), 400 (FIG. 4), and 500 (FIG. 5). For example, method 600 includes receiving media data at 610, receiving a media processing request at 620, starting a transaction at 630, generating a media service request at 640, ending at 650 the transaction started at 630, communicating media data and a media service request at 660, and receiving a media service reply at 670. However, method 600 includes additional actions.

For example, method 600 includes, at 680, starting a second transaction. This transaction will be ended at 699 after the media service reply is processed at 690. Thus, method 600 transaction protects both the generation of the media service request and the processing of the media service reply received in response to the media service request.

Figure 7:
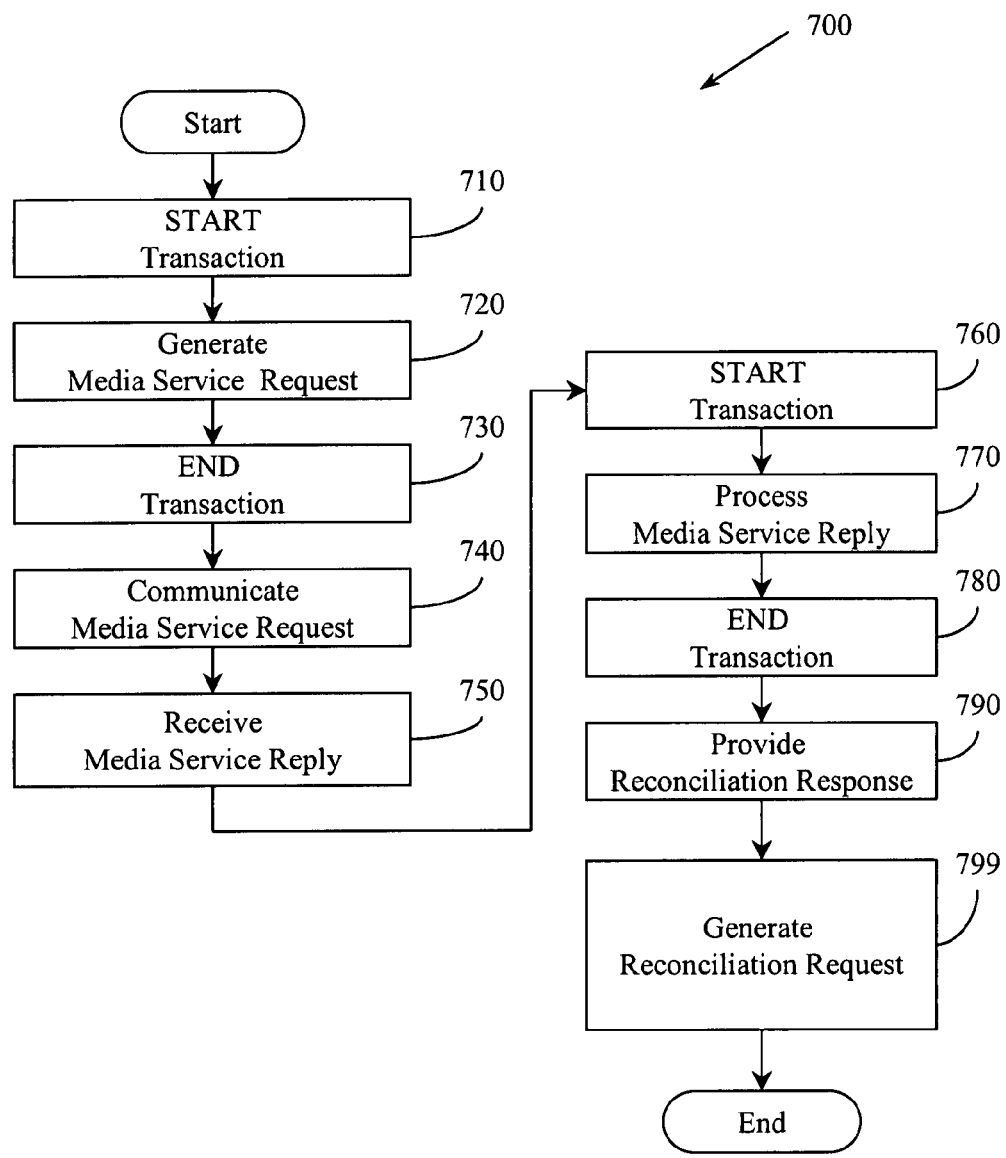
FIG. 7 illustrates an example method associated with a mobile database.

FIG. 7 illustrates a method 700 associated with a reconciliation action between an enterprise database and a mobile database. It is possible that data stored in the two locations may get out of synchronization. For example, an unconscious patient may arrive at a hospital. Some data (e.g., EKG) may be captured for this patient and provided to an enterprise database. Other data (e.g., current address) may not be available because the patient was unconscious. A media service request associated with processing the EKG (e.g., determining whether a heart attack is imminent) may be performed and a media service reply returned. However, a different type of media service reply may also be returned. This reply may indicate that some data (e.g., patient identifier fields) associated with the media data does not match. Thus, a synchronization request may be sent.

Method 700 includes some actions similar to actions associated with methods 300 (FIG. 3), 400 (FIG. 4), 500 (FIG. 5), and 600 (FIG. 6). For example, method 700 includes starting a transaction at 710, generating a media service request at 720, ending at 730 the transaction started at 710, communicating a media service request at 740, receiving a media service reply at 750, starting a transaction at 760, processing the media service reply at 770, and ending at 780 the transaction started at 760. However, method 700 may include other actions associated with reconciling the databases.

For example, method 700 may include, at 790, providing a reconciliation response to the mobile database. The reconciliation response may have been provided to method 700 in the media service reply received at 750 and processed at 770. Method 700 may also include, at 799, generating a subsequent reconciliation request. In one example, both an MDB and an EDB can initiate reconciliation requests. A reconciliation request may be necessary when an MDB or an MDB user detects inconsistent data in the data managed by the MDB. For an EDB, the reconciliation request may be part of a service reply.

Figure 8:
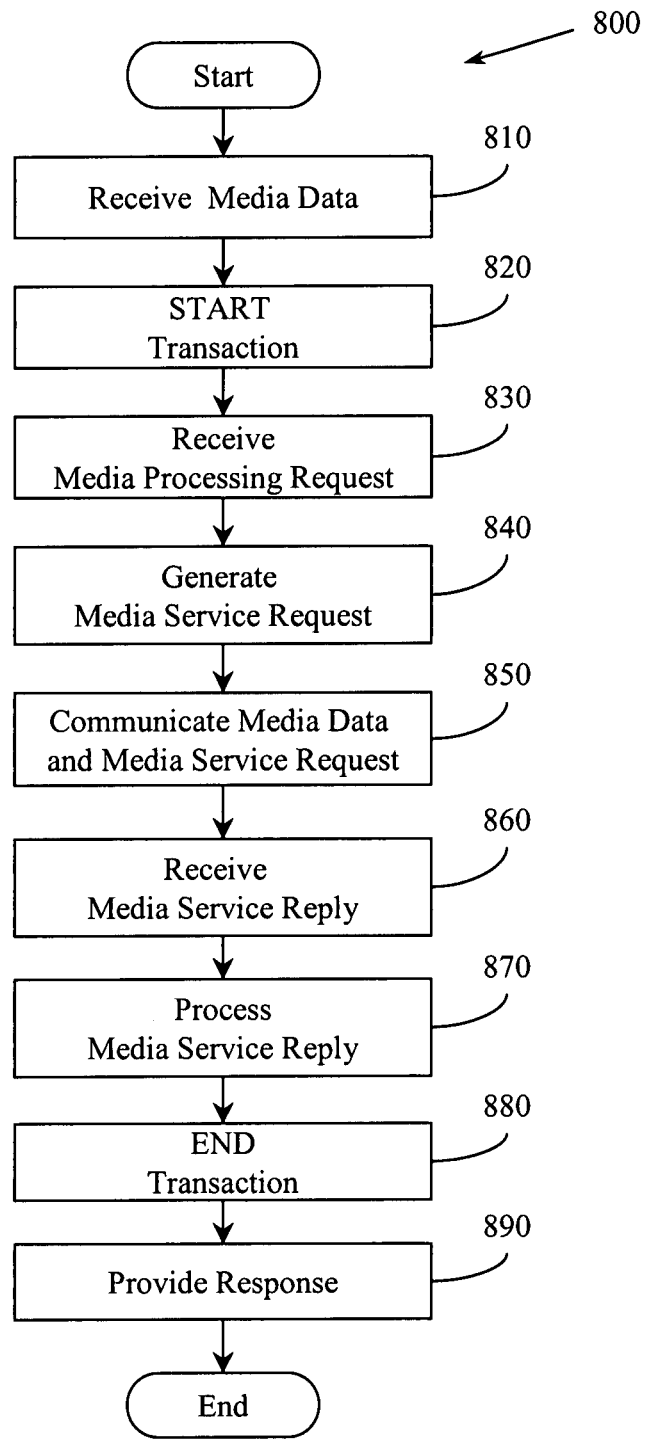
FIG. 8 illustrates an example method associated with a mobile database.

FIG. 8 illustrates a method 800 having a different form of transaction protection. Method 800 includes actions similar to methods 400 (FIG. 4) and 500 (FIG. 5). For example, method 800 includes receiving media data at 810, receiving a media processing request at 830, generating a media service request at 840, communicating the media data and media service request at 850, receiving a media service reply at 860, processing the media service reply at 870, and providing at 890 a response to the processing request received at 830. However, method 800 is transaction protected differently from other methods.

For example, method 800 starts a transaction at 820 after receiving media data at 810 but before receiving a media processing request at 830. Additionally, method 800 does not end the transaction at 880 until after it has processed the media service reply at 870. While method 800 shows a different transaction protection scheme than other methods, it is to be appreciated that different methods may be transaction protected using still other schemes.

Figure 9:
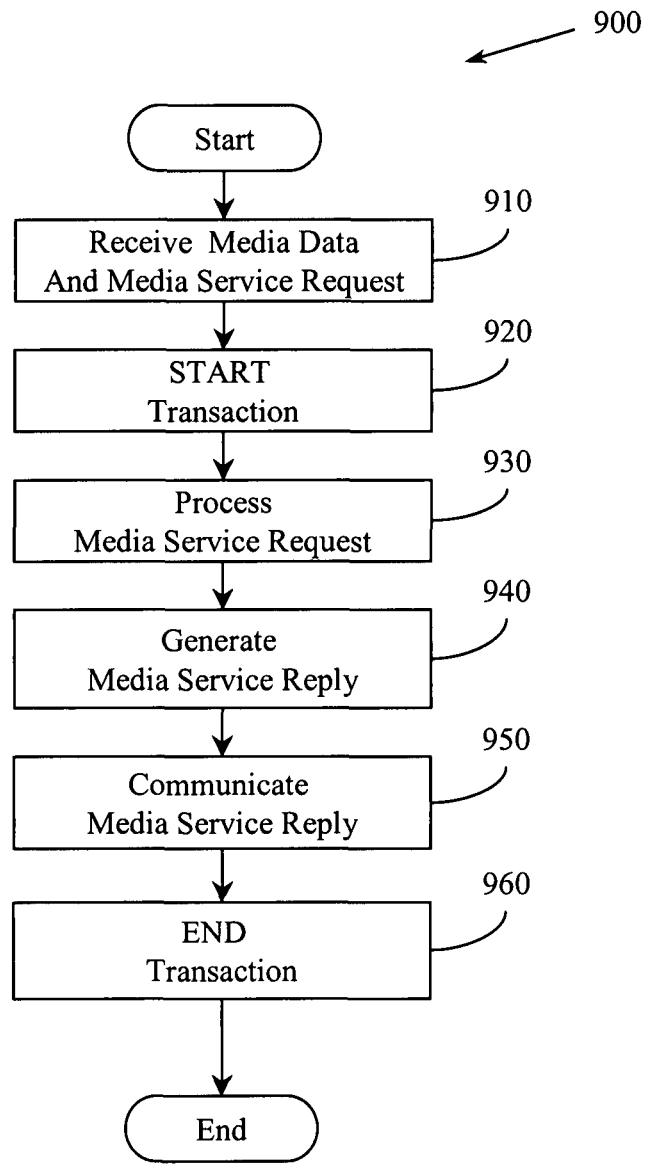
FIG. 9 illustrates an example method associated with a mobile database.

FIG. 9 illustrates a method 900 that may be performed at an enterprise database server in response to actions taken by a mobile database client. The mobile database client may be configured with proxy entities (e.g., proxy objects) related to services that may be performed by the enterprise database server. Thus, the mobile database may send media data to the enterprise database along with requests to process that media data.

Method 900 may include, at 910, receiving at the enterprise database both media data and a media service request from a mobile database. The enterprise database is to function as a media server for the mobile database and thus the media service request may indicate an action that is to be taken on or in relation to the media data. For example, the media service request may ask that the media data be manipulated in some way or the media service request may ask that information about the media data be provided back to the mobile database.

While two media service request actions are described, it is to be appreciated that a greater variety of actions may be requested.

Method 900 may also include, at 920, starting a transaction. After the transaction is started, method 900 may proceed, at 930, to process the media service request, and at 940, to generate a media service reply associated with the media service request. This reply may indicate that an action has been performed, may provide information and/or media data back to the mobile database, and so on. With the media service request generated, method 900 may proceed, at 950, with communicating the media service reply from the enterprise database to the mobile database. Having provided the media service reply, method 900 may conclude, at 960, by ending the transaction that was started at 920.

Figure 10:
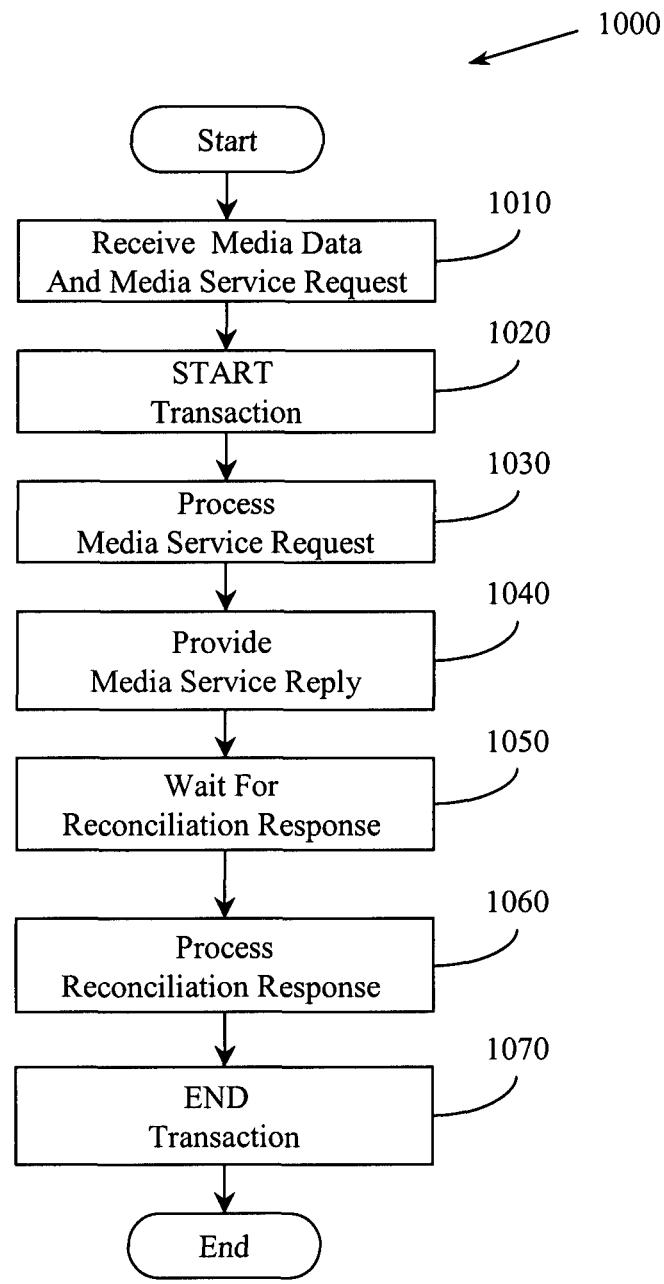
FIG. 10 illustrates an example method associated with a mobile database.

FIG. 10 illustrates a method 1000 that includes certain actions similar to those described in connection with method 900 (FIG. 9). For example, method 1000 includes receiving media data and a media service request at 1010, starting a transaction at 1020, processing the media service request at 1030, providing a media service reply at 1040, and ending a transaction at 1070. However, method 1000 includes additional actions.

These additional actions may be performed upon determining that a data item may be out of synchronization between the mobile database and the enterprise database. For example, method 1000 includes waiting for a reconciliation response at 1050. This action may occur when the media service reply provided at 1040 is a reconciliation request. A reconciliation request may be made in an attempt to synchronize a mobile database with an enterprise database. After waiting for the reconciliation response at 1050, method 1000 may proceed, at 1060, with processing a reconciliation response received at the enterprise database. The waiting performed at 1050 may in some examples by synchronous waiting while in other examples may be asynchronous waiting.

Figure 11:
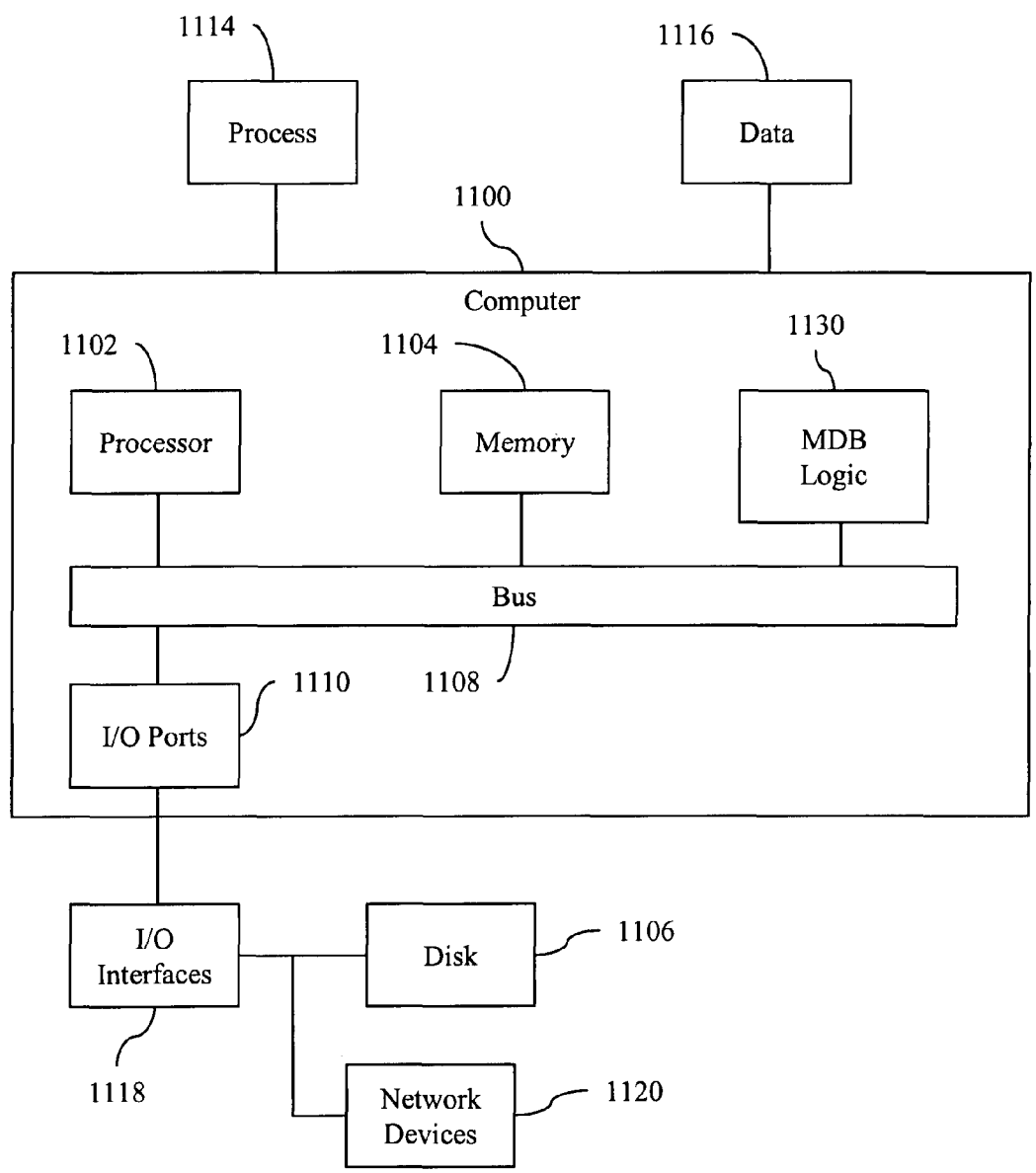
FIG. 11 illustrates an example computing environment in which example systems and methods illustrated herein can operate.

FIG. 11 illustrates an example computing device in which example systems and methods described herein, and equivalents, can operate. The example computing device may be a computer 1100 that includes a processor 1102, a memory 1104, and input/output ports 1110 operably connected by a bus 1108. In one example, the computer 1100 may include an MDB logic 1130. In one example, logic 1130 may include means (e.g., hardware, software in execution, firmware) for processing multimedia data in a mobile database associated with computer 1100. These means may include proxy objects related to a media server with which computer 1100 can communicate. Therefore, logic 1130 may also include means (e.g., hardware, software in execution, firmware) for generating a service request associated with remote processing of multimedia data in the mobile database. The remote processing may be performed by the media server that provides services to the mobile database. Logic 1130 may also include means (e.g., hardware, software in execution, firmware) for communicating the service request to the media server and receiving from the media server a reply to the service request. Thus MDB logic 1130 may provide means (e.g., hardware, software, firmware) for making services available on computer 1100 for a mobile database stored thereon that would otherwise not be available.

Generally describing an example configuration of the computer 1100, the processor 1102 can be a variety of various processors including dual microprocessor and other multi-processor architectures. The memory 1104 can include volatile memory and/or non-volatile memory. The non-volatile memory can include, but is not limited to, ROM, PROM, EPROM, EEPROM, and so on. Volatile memory can include, but is not limited to, RAM, synchronous RAM (SRAM), dynamic RAM (DRAM), synchronous DRAM (SDRAM), double data rate SDRAM (DDR SDRAM), and direct RAM bus RAM (DRRAM).

A disk 1106 may be operably connected to the computer 1100 via, for example, an input/output interface (e.g., card, device) 1118 and an input/output port 1110. The disk 1106 can include, but is not limited to, devices like a magnetic disk drive, a solid state disk drive, a floppy disk drive, a tape drive, a Zip drive, a flash memory card, and/or a memory stick. Furthermore, the disk 1106 can include optical drives including a CD-ROM, a CD recordable drive (CD-R drive), a CD rewriteable drive (CD-RW drive), a digital video ROM drive (DVD ROM), and so on. The memory 1104 can store processes 1114 and/or data 1116, for example. The disk 1106 and/or memory 1104 can store an operating system that controls and allocates resources of the computer 1100. Disk 1106 and/or memory 1104 may also store data 1116.

The bus 1108 can be a single internal bus interconnect architecture and/or other bus or mesh architectures. While a single bus is illustrated, it is to be appreciated that computer 1100 may communicate with various devices, logics, and peripherals using other busses that are not illustrated (e.g., PCIE, SATA, Infiniband, 1394, USB, Ethernet). The bus 1108 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1100 may interact with input/output devices via i/o interfaces 1118 and input/output ports 1110. Input/output devices can include, but are not limited to, a keyboard, a microphone, a pointing and selection device, cameras, video cards, displays, disk 1106, network devices 1120, and so on. The input/output ports 1110 can include but are not limited to, serial ports, parallel ports, and USB ports.

The computer 1100 can operate in a network environment and thus may be connected to network devices 1120 via the i/o devices 1118, and/or the i/o ports 1110. Through the network devices 1120, the computer 1100 may interact with a network. Through the network, the computer 1100 may be logically connected to remote computers. The networks with which the computer 1100 may interact include, but are not limited to, a local area network (LAN), a wide area network (WAN), and other networks. The network devices 1120 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.111.1), and so on. Similarly, the network devices 1120 can connect to WAN technologies including, but not limited to, point to point links, circuit switching networks (e.g., integrated services digital networks (ISDN), packet switching networks, digital subscriber lines (DSL)).

Figure 12:
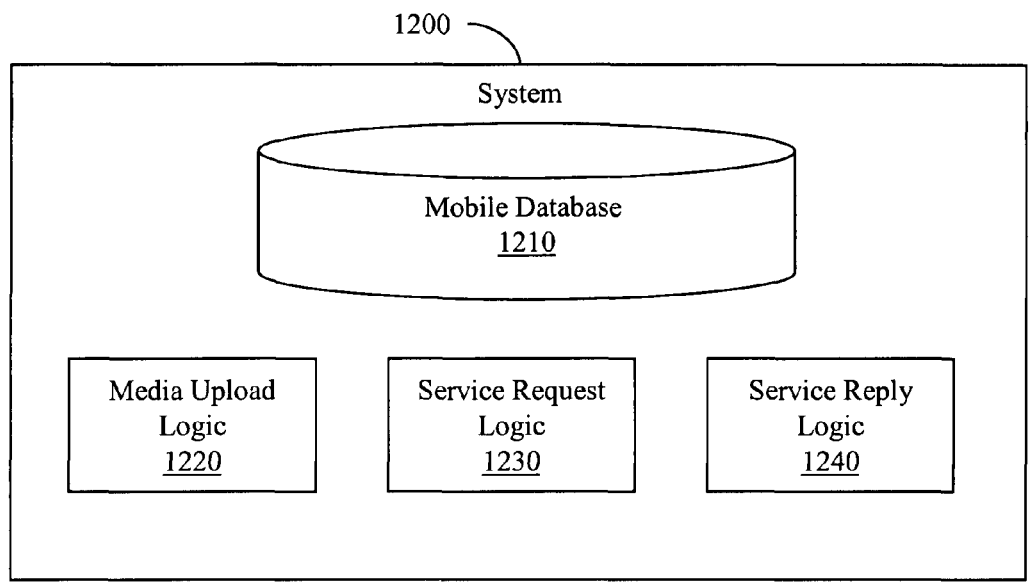
FIG. 12 illustrates an example system on which a mobile database may reside.

FIG. 12 illustrates a system 1200 that includes logics for implementing the data flows illustrated in FIG. 2. System 1200 may be implemented, for example, on a mobile data capture device (e.g., cellular telephone, handheld scanner, digital camera), a personal electronic device (e.g., personal digital assistant (PDA)), and so on. System 1200 may include a mobile database 1210. Mobile database 1210 may receive and store media and/or multimedia data (e.g., pictures, videos, music, conversations). The media data may include, for example, digital image data, digital video data, digital voice data, and digital music data. Through data flows achieved using the illustrated logics, mobile database 1210 may appear to provide media services conventionally provided by back-end databases.

System 1200 may include a media upload logic 1220 for communicating media data from the mobile database 1210 to an enterprise database. Logic 1220 may transfer media data including, for example, movie data, picture data, voice data, and so on. This data may be moved in different manners. In one example, the data may be moved as a stream of bytes while in another example the data may be moved as a binary large object (BLOB). In one example, media upload logic 1220 may discover communication channels between system 1200 and an EDB and select a channel based, at least in part, on its ability to communicate media data. For example, media upload logic 1220 may identify a socket, may establish a stream, may open a port, and so on, to facilitate transferring media data from MDB 1210 to an EDB. In one example, this transfer may not be transaction protected. Thus, in the example, logs (e.g., redo log) associated with transaction protected transfers may not have to be processed. This may facilitate more efficient (e.g., rapid) transfer of data from MDB 1210 to an EDB.

In one example, the media upload logic 1220 is to select a communication type for communicating media data between the mobile database 1210 and the enterprise database. A communication type may include a communication channel, a communication protocol, and so on. The media upload logic 1220 may select the communication type based on factors including, but not limited to, a signal to noise ratio associated with a channel, a transfer bandwidth associated with a channel and/or protocol, a security measure, an availability measure, a cost measure, and so on.

Communications between local and remote devices and/or between local and remote databases may be transaction protected. Transaction protecting a communication may include storing information in logs, and other actions. These actions may consume resources (e.g., computing cycles, time, memory). Some communications may selectively be protected while others are selectively not protected. Thus, in one example, the media upload logic 1220 will make sure that the transfer of media data between the mobile database 1210 and the enterprise database is not transaction protected.

System 1200 may also include a service request logic 1230 for creating a media service request and for communicating the media service request from the system 1200 to the enterprise database. A media service request may describe an action to be performed on a piece of media data stored in the mobile database 1210 and/or in an enterprise database. The action requested may include, but is not limited to, a search action, an index action, a query action, and a manipulation action. In one example, the media upload logic 1220 and the service request logic 1230 are to communicate media data and media service requests in parallel.

The service request logic 1230 may, like the media upload logic 1220, be selective in choosing a communication type for communicating a media service request from the mobile database 1210 to the enterprise database. Like the media upload logic 1220, the service request logic 1230 may select the communication type based on factors including, but not limited to, a signal to noise ratio, a transfer bandwidth, a security measure, and an availability measure.

The mobile database 1210 may not be permanently connected to an enterprise database. Thus, the service request logic 1230 may selectively queue media service requests for delivery to the enterprise database. Additionally, and/or alternatively, the service request logic 1230 may determine where a media service request is to be processed. Processing choices may include locally processing the media service request by a processor associated with the mobile database 1210 and remotely processing the media service request by a processor associated with the enterprise database. The decision may be based on factors including, but not limited to, connectivity, relative processing power, load distribution, and so on.

System 1200 may also include a service reply logic 1240 for receiving a media service reply from the enterprise database. The media service reply may describe an action performed by the enterprise database in response to a media service request. The media service reply may describe items including, but not limited to, an action success, an action failure, and a reconciliation request.

In one example, the service reply logic 1240 controls the system 1200 to provide a reconciliation copy of a data item located in the mobile database 1210. The reconciliation copy can be used to bring the mobile database 1210 and the enterprise database into agreement on the value of the data item. In one example, the service reply logic 1240 controls the system 1200 to provide the reconciliation copy based on information received in a media service reply.

The service request logic 1230 and the service reply logic 1240 may cooperate to transaction protect communication pairs. For example, the service request logic 1230 and the service reply logic 1240 may transaction protect a pair of communications including a media service request and a related media service reply. The service request logic 1230 and the service reply logic 1240 may cooperate in other ways. For example, the service reply logic 1240 may control the service request logic 1230 to generate a subsequent media service request based, at least in part, on the media service reply. This subsequent media service may be used to synchronize the databases. Additionally, the service request logic 1230 and service reply logic 1240 may synchronize their actions. For example, the service request logic 1230 may control the service reply logic 1240 to wait for a media service reply. In different examples the waiting may be synchronous or asynchronous.

Mobile database 1210 and/or system 1200 may be used, for example, in the healthcare arena. This arena may include, for example, emergency rooms, life flight helicopters, battlefields, and other locations where mobile data capture devices may capture medical data (e.g., vital signs, imagery). The arena may also include, for example, carts that are wheeled between rooms to capture medical information (e.g., ultrasound imaging cart, cardiac data cart). These mobile data capture devices may capture multimedia content (e.g., ultrasound image with sound). This content may need to be stored and secured. This content may also need to be able to be queried, able to be indexed, and able to be retrieved. Conventionally, a mobile data capture device simply captured data. The data may have been stored as an unknown set of bytes (e.g., BLOB) that was not recognizable in the mobile device and upon which actions could not be taken. The data flows illustrated in FIG. 2 and the logics illustrated in FIG. 12 facilitate adding to the mobile database 1210 the ability to do more than simply capture data and provide data to an enterprise database.

Proxy objects in system 1200 may recognize captured data and make back-end database management available through a service request queue. Consider an emergency room. A mobile data capture device associated with a mobile database may acquire image data, vital signs, and so on. However, accurate personal data (e.g., name, social security number, insurance data) may not be acquired. The mobile database may note deltas describing what is different between data acquired during this visit by this patient and data acquired during another visit by this patient. The mobile database may therefore queue up a service request to acquire from an enterprise database the missing or inaccurate data identified by the delta.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   at least a mobile database and a processor;
   a media upload logic for communicating media data from the mobile database to an enterprise database that is remotely located;
   a service request logic for processing a media request received from a user, where the media request describes an action associated with a media data;
   where the service request logic is configured to determine and select between locally processing the media request by the processor associated with the mobile database, or remotely processing the media request with the enterprise database, where the determining is based, at least in part, on whether the media request can be performed on the mobile database,
   if the service request logic determines that the media request cannot be performed on the mobile database, the media request is transferred to the enterprise database for remotely processing the media request with the enterprise database;
   a service reply logic for receiving a media service reply from the enterprise database, where the media service reply includes a result from processing the media request where the system appears to locally perform the media services that are performed by the enterprise database.

2. The system of claim 1, where the mobile database resides on a mobile data capture device.

3. The system of claim 2, the media data including one or more of, digital image data, digital video data, digital voice data, and digital music data.

4. The system of claim 1, where the media upload logic is to prevent the transfer of media data between the mobile database and the enterprise database from being transaction protected.

5. The system of claim 1, where the service request logic and the service response logic are to transaction protect a pair of communications including the media request or a related media service reply.

6. The system of claim 1, where the media request describes a search action, an index action, a query action, or a manipulation action.

7. The system of claim 6, where the media service reply describes an action success, an action failure, or a reconciliation request.

8. The system of claim 1, where the media upload logic and the service request logic are to transfer the media data and the media request in parallel to the enterprise database.

9. The system of claim 1, where the service request logic is to selectively queue media requests for delivery to the enterprise database.

10. The system of claim 1, where the service reply logic is to control the service request logic to generate a subsequent media service request based, at least in part, on the media service reply.

11. The system of claim 1, where the service request logic is to control the service reply logic to wait for a media service reply.

12. The system of claim 11, where the service request logic is to control the service reply logic to wait asynchronously for a service reply.

13. The system of claim 1, where the service reply logic is to control the system to provide a reconciliation copy of a data item located in the mobile database, the reconciliation copy to bring the mobile database and the enterprise database into agreement on the value of the data item, the service reply logic to control the system to provide the reconciliation copy based, at least in part, on a media service reply.

14. The system of claim 1, where the service reply logic is configured to update the mobile database based, at least in part, on the media service reply.

15. The system of claim 1, where the media upload logic is configured to communicate the media data from the mobile database to the enterprise database on a first channel of a plurality of channels in parallel with the service request logic communicating the service request from the system to the enterprise database on a second channel of the plurality of channels.

16. A non-transitory computer-readable medium storing processor executable instructions that when executed by a processor cause the processor to perform actions, the executable instructions comprising instructions configured for:
   receiving a media processing request by a mobile device, where the mobile device contains the processor and a mobile database, where the media processing request is to be performed on media data on the mobile device, where the mobile device is configured with one or more proxy entities related to an enterprise database, where the enterprise database is configured to function as a media server for the mobile database;

queuing the media processing request in a queue maintained by at least one of the one or more proxy entities related to the enterprise database;

determining, by one of the proxy entities, that the media processing request cannot be performed by the mobile device and in response, generating a media service request associated with the media processing request and transferring the media service request to the enterprise database;

transferring the media data from the mobile database to the enterprise database in parallel with the media service request;

receiving a media service reply from the enterprise database at the mobile database that includes results to the media service request;

providing a response to the media processing request, the response being based, at least in part, on the results from the media service reply.

17. The computer-readable medium of claim 16, further comprising instructions configured for:

starting a first transaction before generating the media service request; and ending the first transaction after generating the media service request.

18. The computer-readable medium of claim 17, further comprising instructions configured for:

starting a second transaction before processing the media service reply;

processing the media service reply; and ending the second transaction after processing the media service reply.

19. The computer-readable medium of claim 18, further comprising instructions configured for:

providing a reconciliation request to the mobile database based, at least in part, on the media service reply; and generating a second media service request, the second media service request being a reconciliation response responsive to the reconciliation request.

20. The computer-readable medium of claim 16, further comprising instructions configured for:

starting a first transaction before receiving the media processing request; and ending the first transaction after processing the media service reply.

21. A system, comprising:

means for processing multimedia data in a mobile database;

means for generating a service request associated with remote processing of the multimedia data in the mobile database;

means for determining that the service request cannot be processed by the mobile database;

means for communicating the service request to a media server associated with providing services to the mobile database and for transferring the multimedia data to the media server, where the service request is communicated in parallel with the communication of the multimedia data;

means for receiving from the media server a reply to the service request.

22. A non-transitory computer-readable medium storing processor executable instructions that when executed by a processor cause the processor to perform actions, the executable instructions comprising instructions configured for:

receiving a service request to perform a function by a mobile device that includes a mobile database, where the mobile database acts as a proxy for an enterprise database, where the mobile database contains a partial database of a whole database contained by the enterprise database;

queuing the service request in a queue on the mobile device;

determining whether to handle the service request locally, at the mobile database, or to transfer the service request to the enterprise database, where the determining is based, at least in part, on whether the function can be performed on the partial database;

transferring the service request from the queue to the enterprise database for execution of the function on the whole database, in response to a determination that the service request cannot be performed on the partial database; and receiving a result, from the enterprise database, in response to the function being performed such that it appears that the function is performed by the mobile database.

23. The computer-readable medium of claim 22, where the determining is further based, at least in part, on one or more of a hardware configuration, a software configuration, a ratio of computing power, a load ratio, a communication bandwidth, and a security measure.

24. The computer-readable medium of claim 22, where the determining is based, at least in part, on dynamic factors so that the determination is made on an ad hoc basis.

25. The computer-readable medium of claim 22, where the function is a search query directed to be performed on content in the mobile database, which when transferred to the enterprise database, the search query is performed on the enterprise database.

26. The computer-readable medium of claim 22, where the service request is a search request and the function is a search function, such that determining whether to perform the search request locally, at the mobile database, or to transfer the search request to the enterprise database, is based, at least in part, on whether the search function can be performed on the partial database.

27. The computer-readable medium of claim 22, further comprising instructions configured for:

recognizing media data captured by the mobile device; and causing the proxy to search the media data, index the media data, and process the media data.

28. A method performed by a mobile device that is a computing device including at least a processor for executing instructions, the method comprising:

receiving a service request to perform a function by the mobile device that includes a mobile database, where the mobile database acts as a proxy for an enterprise database, where the mobile database contains a partial database of a whole database contained by the enterprise database;

queuing, by at least the processor, the service request in a queue on the mobile device;

determining, by at least the processor, whether to handle the service request locally, at the mobile database, or to transfer the service request to the enterprise database, where the determining is based, at least in part, on whether the function can be performed on the partial database;

transferring, by at least the processor, the service request from the queue to the enterprise database for execution of the function on the whole database, in response to a determination that the service request cannot be performed on the partial database; and receiving a result, from the enterprise database, in response to the function being performed such that it appears that the function is performed by the mobile database.

29. The method of claim 28, further comprising:

receiving at the enterprise database the service request from the mobile database;

receiving at the enterprise database media data from the mobile database;

starting a transaction;

processing the service request on the enterprise database to produce results;

generating a service reply including the result associated with the service request;

communicating the service reply from the enterprise database to the mobile database; and ending the transaction.

30. The method of claim 29, the method further including:

determining that a data item may be out of synchronization between the mobile database and the enterprise database;

configuring the service reply as a reconciliation request;

waiting for a reconciliation response associated with the service reply configured as a reconciliation request; and processing the reconciliation response.

* * * * *

UNITED STATES PATENT AND TRADEMARK OFFICE
CERTIFICATE OF CORRECTION

| | | |
|---|---|---|
| PATENT NO. | : 9,146,922 B2 | Page 1 of 1 |
| APPLICATION NO. | : 11/881341 | |
| DATED | : September 29, 2015 | |
| INVENTOR(S) | : Guo | |

It is certified that error appears in the above-identified patent and that said Letters Patent is hereby corrected as shown below:

On the title page item [56], column 2, line 5, delete "Oracale" and insert -- Oracle --, therefor.

Signed and Sealed this
Thirty-first Day of May, 2016

Michelle K. Lee
*Director of the United States Patent and Trademark Office*